United States Patent [19]

Fotland

[11] 3,961,574
[45] June 8, 1976

[54] ELECTROSTATIC BAR CODE PRINTER

[75] Inventor: Richard A. Fotland, Aurora, Ohio

[73] Assignee: Horizons Incorporated, Cleveland, Ohio

[22] Filed: Jan. 15, 1975

[21] Appl. No.: 541,292

[52] U.S. Cl. .............................. 101/1; 101/DIG. 13
[51] Int. Cl.² ............................................ B41J 3/18
[58] Field of Search ......... 101/DIG. 13, 1, 382 MV; 197/1; 271/276; 346/74 R, 74 ES

[56] References Cited
UNITED STATES PATENTS

| | | | |
|---|---|---|---|
| 2,659,652 | 11/1953 | Thompson | 101/13 |
| 3,060,429 | 10/1962 | Winston | 197/1 R |
| 3,109,058 | 10/1963 | Luhn | 197/1 R |
| 3,198,517 | 8/1965 | Martin | 271/276 X |
| 3,282,586 | 11/1966 | Schwebel | 271/276 |
| 3,307,477 | 3/1967 | Booher | 101/DIG. 13 |
| 3,314,360 | 4/1967 | Foster | 101/DIG. 13 |
| 3,335,322 | 8/1967 | Epstein et al. | 101/DIG. 13 |
| 3,340,803 | 9/1967 | Childress et al. | 101/DIG. 13 |
| 3,400,656 | 9/1968 | Thourson | 101/DIG. 13 |
| 3,487,775 | 1/1970 | Chaney et al. | 101/DIG. 13 |
| 3,521,558 | 7/1970 | Fisher et al. | 101/DIG. 13 |
| 3,599,225 | 8/1971 | Babaoff | 101/DIG. 13 |
| 3,631,509 | 12/1971 | Marshall | 101/DIG. 13 |
| 3,777,214 | 12/1973 | Taylor et al. | 101/DIG. 13 |
| 3,834,301 | 9/1974 | Croquelois et al. | 197/1 R |
| 3,875,320 | 4/1975 | Forgo et al. | 101/DIG. 13 |

Primary Examiner—Edgar S. Burr
Assistant Examiner—Paul J. Hirsch
Attorney, Agent, or Firm—Lawrence I. Field

[57] ABSTRACT

A printing apparatus for generating visible bar code images in accordance with an electronic input command which comprises: a conducting mask containing a slot, a fine diameter ion emitting wire positioned on one side of the mask and adjacent to this slot and an electrically conductive support member. An insulating latent charge image receiving member is transported at a uniform velocity while spaced a short distance from the slotted mask and on the side of the mask opposite the side to which the ion emitting wire is adjacent. A potential is applied between the slotted mask and the conducting support member upon which the insulating member rests. Conventional means are provided for electrostatically toning the latent image formed on the insulating surface and additional means are provided for fixing the toned image. Transport means are provided to move the insulating member, at a uniform velocity, through the latent image forming, toning, and fixing stations. The height of the bar code images formed is determined by the length of the slot in the mask and the widths of the bars are defined by the duration of the high voltage pulses applied to the ion emitting wire.

1 Claim, 3 Drawing Figures

ELECTROSTATIC BAR CODE PRINTER

This invention relates to an apparatus for the production of bar code images upon insulating surfaces which apparatus includes a slotted conducting mask and an ion emitting wire which is electrically pulsed to provide a supply of ions which are directed toward and through the slot in order to form a latent electrostatic image upon the insulating surface. The latent image is subsequently electrostatically toned and fused to fix the image. The width of each bar is controlled in accordance with the duration, i.e. the width, of a high voltage pulse applied to the ion emitting wire.

Electrostatic printers employing the principle of charge transfer between a metal surface and an insulating latent image charge receptor medium are well known. A number of printers employing pin arrays to transfer charge in this manner and employing dielectric paper as a latent image receptor means together with electrostatic toning and fixing means have been commercially available for a number of years. Such devices are described, for example, in R. S. Howell, U.S. Pat. No. 3,267,485 issued Aug. 16, 1966; F. A. Schwertz, U.S. Pat. No. 3,289,209 issued Nov. 29, 1966; U. Rothgrodt, U.S. Pat. No. 3,483,566 issued Dec. 9, 1969; and Lamb, U.S. Pat. No. 3,725,950 issued Apr. 3, 1973; and elsewhere in the literature. Another approach for forming electrostatic latent images employing a character matrix or a metal character high-speed rotating drum is described in F. A. Schwertz, U.S. Pat. Nos. 3,064,259 and 3,068,481 issued on Nov. 13, 1962; and Dec. 11, 1962. Other United States Patents describing this printing technique include Mott, U.S. Pat. No. 3,208,076 issued Sept. 21, 1965 and Macovski, U.S. Pat. No. 3,417,404 issued Dec. 17, 1968. Another approach in forming latent electrostatic images upon dielectric surfaces involves the use of a cathode ray tube having a face plate containing an array of conducting pins, as described in U.S. Pat. Nos. to Crews, 2,929,973 issued Mar. 15, 1960; Crews et al 2,952,796 issued Sept. 13, 1960; Crews et al 2,963,607 issued Dec. 6, 1960 and Walkup, U.S. Pat. No. 3,001,848 issued Sept. 26, 1961.

In the above inventions, effective electrostatic charge transfer only occurs when the metal image-forming member is touching the dielectric surface or is spaced not more than a few thousands of an inch from the dielectric surface. At greater spacings, quite high potentials are required to break down the air gap between the metal image-defining member and the dielectric surface. This results in image spreading with degradation of edge sharpness.

My copending U.S. patent application Ser. No. 454,170, filed Mar. 25, 1974 now abandoned, describes an electrostatic printer in which an ion emitting wire is pulsed and a mask employed to define the electrostatic latent image formed on an insulating surface. This present invention differs in that a slotted mask is employed to define the height of a bar to be subsequently formed on the insulated member while the pulse width applied to the ion emitting wire is varied so as to provide means to vary the width of the formed bar.

One advantage of the present invention is that high resolution precision latent electrostatic images may be formed in a noncontacting manner, the image defining mask being spaced as far as ¼ inch away from the dielectric receptor surface. This spacing eliminates wear of the image defining mask and eliminates abrasion of the dielectric surface which would occur when a contact charge transfer process is utilized. An additional advantage of the present invention resides in its extreme simplicity and in the small number of components required to form bar codes having substantially any desired bar width, the bar width being controlled by the width of the high voltage pulse applied to the ion emitting wire.

This invention will be more fully understood from a consideration of the drawings in which.

Figure 1:
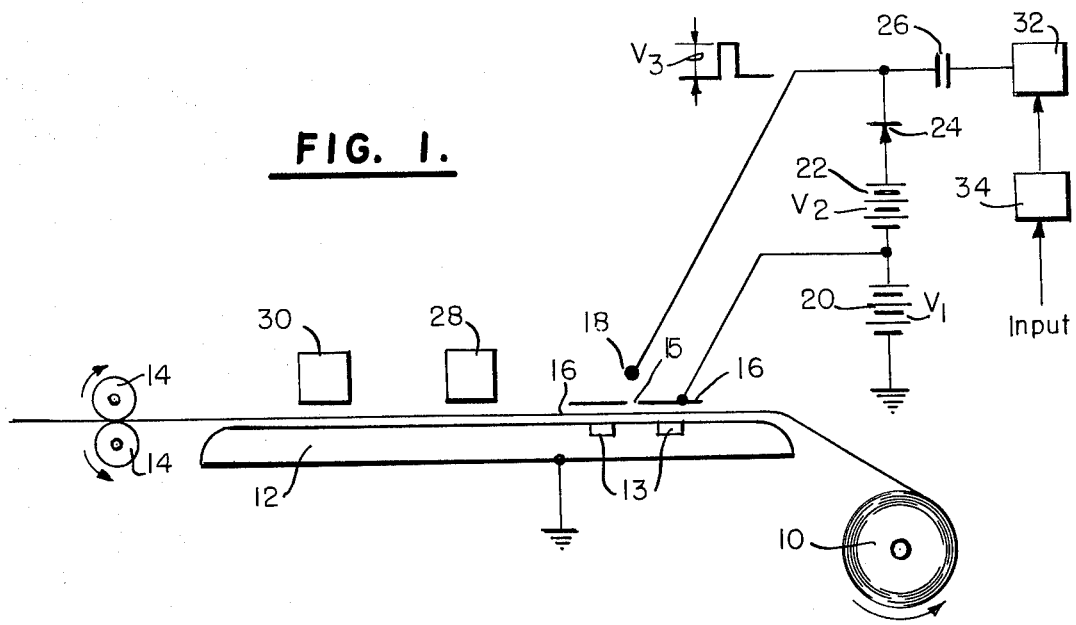
FIG. 1 is a schematic plan view of the electrostatic bar code printer.

In FIG. 1, the insulating latent image receptor member is shown as a roll of commercially available paper 10. This paper, sometimes described as electrographic paper usually consists of a conducting paper base, the surface of which is coated with a thin pigmented insulating resin. As shown in FIG. 1, this dielectric paper as it unwinds from the supply roll, is passed over and supported on a conducting platen 12 and driven through the printer, in the form of a web, by drive rollers 14. Drive rollers 14 may be powered with a synchronous motor or other known means suitable to maintain a uniform web velocity. Slots 13 are milled in conducting platen 12 and a small vacuum is maintained in these slots in order to provide a vacuum hold-down for the web to overcome the electrostatic attractive forces tending to lift the web from conducting platen 12. A conducting mask 16 contains a slot 15 a few mils in width and having a length equal to the height of the bar to be printed. A source of ions is provided by a fine ion emitting wire 18. A source of potential 20 provides an electrical potential, $V_1$, between the slotted mask 16 and the conducting paper support 12. Additional voltage, $V_2$, is supplied by power supply 22 to bias the ion emitting wire 18 at a point just below the corona threshold voltage. A diode 24 is provided to clamp the corona wire potential at a point above ground equal to $V_1 + V_2$ while still permitting the ion emitting wire potential to rise above this level when a voltage pulse having amplitude $V_3$ is applied to the ion emitting wire through coupling capacitor 26. The pulse, whose width may be varied, is provided by pulse generator 32. The width is controlled by electronic control circuits 34.

Electrostatic latent image development means are provided as toning unit 28. Either liquid or dry toning may be utilized employing means well known to those skilled in the art. If a self-fixing liquid toner is not utilized here, then image fixing means are required. Fixing is carried out by known means shown as unit 30 consisting, for example, of radiant or thermal contact fusing or pressure roller fixing means. Such means are also well known to those skilled in the art.

Figure 2:
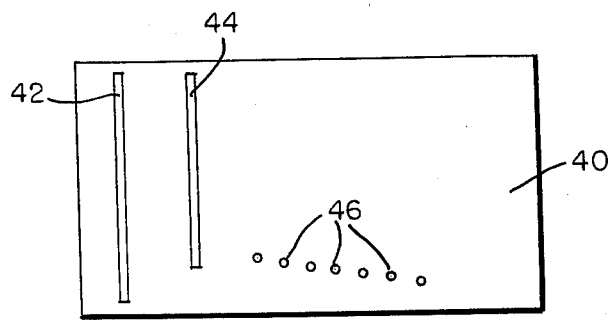
FIG. 2 is a view of a mask specifically fabricated for printing the universal product code bar code symbol.

FIG. 2 is a drawing showing a mask 40 to be used in place of mask 16 in the apparatus of FIG. 1. Mask 40 is useful in forming the universal product code symbol, as defined by the Uniform Grocery Product Code Council Inc. This code symbol consists of an array of variable width bars, having two heights, together with a sequence of code numbers in human readable form, positioned directly below the bars. The long slot 42 is employed to form the long bar while the shorter slot 44 is utilized in forming the shorter bars. A series of small round apertures 46 are employed in this mask to form a dot matrix human readable character. The mask itself 40 may be conveniently formed of thin stainless steel employing photofabrication techniques. In one such mask the long bars are 0.965 inch in height while the short bars are 0.900 inch high. If the character is to be formed from a 7 element high dot matrix, then the spacing in a vertical direction between the round apertures, shown in FIG. 2, would be approximately 0.017 inch. The diameter of each aperture is approximately 0.02 inch. When the mask shown in FIG. 2 is employed in the apparatus of FIG. 1, then two pulsed corona ion source wires must be utilized, one wire positioned above each slot in the mask. The ion emitting wires must be slightly longer than the aperture and may conveniently be spaced 0.10 inch above the mask. The source of ions which provide for the human readable character may consist of either short lengths of ion emitting wires positioned above each circular aperture 46 in mask 40 or may consist of corona emitting points positioned above each aperture and spaced a short distance above each aperture. In the case of the mask shown in FIG. 2, a total of nine pulse generators is required, one for the long bar, one for the short bar, and seven for each of the ion emitting points associated with each dot matrix aperture.

Figure 3:
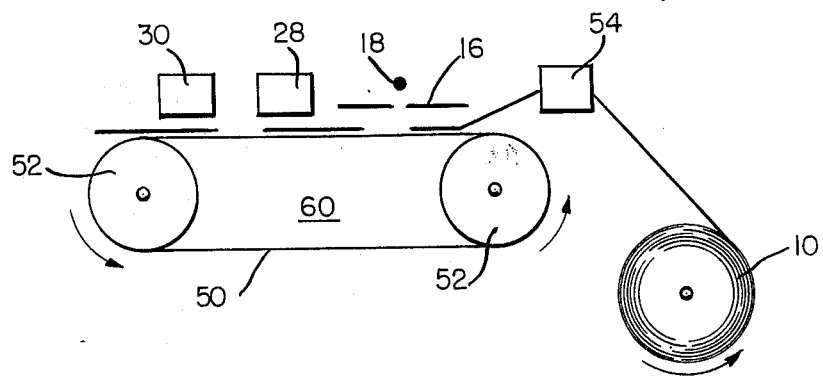
FIG. 3 is a view of an apparatus for printing upon individual labels.

In FIG. 3, supply roll 10, mask 16, pulsed corona wire 18, developing means 28, and fixing means 30, are the same as in FIG. 1. Individual labels are cut from the roll stock employing label cutting means 54, and the cut labels directed onto electrically conducting vacuum belt 50. The label cutter 54 may be of the guilloting type, or shear, or rotating cutter bar or any suitable cutting means well known to those skilled in the art. The vacuum belt may be formed of conducting rubber containing many small apertures, a fine mesh screen, or any other support which is both electrically conducting and porous to the flow of air. A partial vacuum is maintained in the region 60 enclosed by the vacuum belt and side plates (not shown in FIG. 3). With this apparatus, it is possible to supply a single label upon demand without having the waste paper leader and trailer which would be present with a single label web fed machine as shown in FIG. 1.

The operation of this apparatus may be understood from the description of the following example:

An ion generating fine wire 18 consisting of a 2 mil diameter platinum iridium alloy was mounted on insulating supports 0.1 inch above the image defining mask 16. The corona wire was 1.5 inch in length and the image defining mask was square and 1½ inches long on each side. This image defining mask consisted of 5 mil thick stainless steel sheet in which a slot was etched employing a known photo-fabrication technique. The slot was 1 inch long and 10 mils in width. An aluminum support platen 12 was positioned 0.025 inch below the imaging defining mask 16. A 2 inch wide strip of dielectric (electrographic) paper 10 was pulled through the apparatus at constant velocity of 3 inches/second. The dielectric paper was maintained in contact with the paper support platen though the use of a slight vacuum which was maintained in a rectangular slot 13 milled into the support platen 12. A power supply 20 was connected between the image defining mask 16 and the conducting paper support platen 12 to provide a potential difference of 400 volts, the image defining mask being positive with respect to the paper support platen which was maintained at ground potential. A second power supply 22 was employed to provide an ion emitting wire bias potential of 2300 volts and a high voltage diode 24 was connected as shown in FIG. 1 in order to clamp the ion emitting wire potential to 2300 volts. Under these conditions the ion emitting wire did not generate ions, the 2300 volt potential being below the corona threshold voltage. As the dielectric paper was being transported under the corona wire mask 16, pulses of various widths and of 1500 volts amplitude were applied to the corona wire 18 through a 0.002 microfarad coupling capacitor 26. The application of this high voltage pulse drove the ion emitting wire above its threshold level and resulted in the generation of ions. The ions generated near the surface of the corona wire were drawn through the image defining mask onto the dielectric paper and an electrostatic latent image was formed on the insulating surface of the dielectric paper. This latent image was toned employing a magnetic brush toning unit and fused with radiant heat. The width of the resultant bars formed on the dielectric paper is a function of the applied pulse width. In this example, for instance, a 4 millisecond long pulse resulted in the formation of a bar having a width of 10 thousandths of an inch. Pulse widths of 6, 10, and 14 milliseconds were found to produce bars having widths of, respectively; 20, 30 and 40 thousandths of an inch. With this technique, it was possible to form bars of any width down to a minimum width of approximately 8 thousandths of an inch.

The device of this invention may also be employed to imprint variable width bar codes on plastic wrapping material rather than a dielectric paper. Indeed, such bars may be formed on any insulating surface providing the thickness of the insulating layer does not exceed approximately 20 thousandths of an inch.

The printing unit of this device is shown employing a corona biasing means. It is not essential that this means be employed. If biasing potential $V_2$ is not supplied, however, the required pulse height is increased from the 1500 volts required in the example to approximately 4000 volts. Corona wire biasing therefor, reduces the requirements for providing very high voltage pulses. The clamping diode 24 may be replaced by a high value resistor. Although such replacement provides satisfactory operation, the resistor provides an additional load to the high voltage pulse generator.

The apparatus of this invention comprises an ion emitting wire, a conducting image defining mask containing one or more bar defining slots, an electrostatic charge image receptor member, a support member for the image receptor member, a source of potential connected between the image defining mask and the support member and a pulse generator for supplying variable width pulses upon electronic command to the ion emitting wire.

I claim:

1. A printing apparatus for generating a visible bar code image in accordance with an electronic input command which comprises:
  an electrically conducting planar mask containing at least one slot, the length of each slot corresponding to the height of a bar within the bar code image to be printed and the width of each slot being a few mils;

a fine diameter ion emitting wire positioned adjacent to one surface of said mask and parallel to said at least one slot;

an electrically conductive support member positioned adjacent the opposite surface of said mask, so as to define a passage between said mask and said electrically conductive support member;

means to transport an insulating, latent-charge receiving web through said passage adjacent to but spaced from the surface of said mask opposite to the surface adjacent which said wire is positioned, while said web is in the passage between said support and said mask;

means to hold said web in physical contact with said support while it is in said passage, said means including means to apply a vacuum to said web as it is transported past said slot to overcome the electrostatic forces tending to lift said web from said support;

means to maintain an electrical potential between said mask and said electrically conductive support and means electrically connected to said last named means to bias said ion emitting wire at a potential just below the corona threshhold voltage;

electronic input command means to apply a high voltage pulse to said ion emitting wire for a selected variable interval corresponding to the bar width which is to be printed for varying the width of each printed bar to a width, smaller, greater or equal to the width of said slot thereby forming a latent charge image on said web; and means to tone said latent image whereby said bar code image is printed as a visible image.

* * * * *